US012766352B2

(12) United States Patent
Buchanan et al.

(10) Patent No.: US 12,766,352 B2
(45) Date of Patent: Oct. 20, 2026

(54) MOBILE FIRE SUPPRESSION SYSTEM

(71) Applicant: Fast Foam Fire Suppression, LLC, Altus, OK (US)

(72) Inventors: Joe Bruce Buchanan, Altus, OK (US); Jeffrey William Davenport, Paoli, OK (US)

(73) Assignee: Fast Foam Fire Suppression, LLC, Altus, OK (US)

( * ) Notice: Subject to any disclaimer, the term of this patent is extended or adjusted under 35 U.S.C. 154(b) by 278 days.

(21) Appl. No.: 18/447,135

(22) Filed: Aug. 9, 2023

(65) Prior Publication Data

US 2024/0050790 A1 Feb. 15, 2024

Related U.S. Application Data

(60) Provisional application No. 63/371,021, filed on Aug. 10, 2022.

(51) Int. Cl.
*A62C 5/02* (2006.01)
*A62C 25/00* (2006.01)

(52) U.S. Cl.
CPC ................ *A62C 5/02* (2013.01); *A62C 25/00* (2013.01)

(58) Field of Classification Search
CPC .................................. A62C 5/02; A62C 25/00
See application file for complete search history.

(56) References Cited

U.S. PATENT DOCUMENTS 4,584,002 A * 4/1986 Cox .......................... A62C 5/02 261/DIG. 26
5,522,660 A * 6/1996 O'Dougherty .......... B01F 25/51 366/136
5,924,589 A * 7/1999 Gordon .............. B65D 77/0466 220/23.91
7,909,112 B2 * 3/2011 Decker .................. A62C 27/00 280/402
7,992,648 B2 * 8/2011 Groonwald ............ A62C 27/00 169/52
8,912,298 B2 * 12/2014 Matsumoto ............. C07C 51/50 526/240

(Continued)

FOREIGN PATENT DOCUMENTS

DE 202012010971 U1 4/2013
ES 2386054 T3 8/2012

*Primary Examiner* — Joseph A Greenlund
(74) *Attorney, Agent, or Firm* — DUNLAP CODDING, P.C.

(57) ABSTRACT

A mobile fire suppression system is described comprising a pump, a substance release tube (SRT), a first tank, a second tank and a recirculation valve assembly (RVA). The pump has a suction inlet and a discharge outlet. The SRT comprises a substance inlet and a substance release outlet. The first tank receives a foaming agent and has a first cavity, a first inlet, and a first outlet. The second tank receives the foaming agent and a carrier agent. The second tank comprises a second cavity, a second inlet, and a second outlet, the first outlet in fluid communication with the second cavity. The RVA comprises a recirculation inlet connected to the discharge outlet, a release outlet connected to the substance inlet, and a recirculation outlet communicating with the second cavity. The RVA selectively directs a flow from the recirculation inlet to one of the release outlet and the recirculation outlet.

8 Claims, 8 Drawing Sheets

(56) References Cited

U.S. PATENT DOCUMENTS

| | | | | |
|---|---|---|---|---|
| 2006/0231644 | A1* | 10/2006 | Breedlove | B08B 3/026 239/398 |
| 2007/0199937 | A1* | 8/2007 | Schutz | A62C 2/065 220/23.91 |
| 2008/0271901 | A1* | 11/2008 | Decker | A62C 27/00 169/46 |
| 2009/0014186 | A1* | 1/2009 | Collins | A62C 27/00 169/30 |
| 2011/0266009 | A1* | 11/2011 | Liu | A62C 27/00 169/52 |
| 2012/0285706 | A1* | 11/2012 | McLoughlin | A62C 33/04 169/24 |
| 2013/0048318 | A1* | 2/2013 | Ewers | A62C 31/12 169/46 |
| 2017/0190344 | A1 | 7/2017 | Bengtzen | |
| 2017/0369295 | A1* | 12/2017 | Tygard | B66C 1/44 |
| 2019/0299040 | A1* | 10/2019 | Schnarr | A62C 3/0228 |
| 2019/0336802 | A1* | 11/2019 | Brown | A62C 31/28 |
| 2021/0069659 | A1* | 3/2021 | Doane | B01F 33/5026 |
| 2022/0362595 | A1* | 11/2022 | Hulinsky | B05B 12/1436 |
| 2024/0050790 | A1* | 2/2024 | Buchanan | A62C 5/02 |

* cited by examiner

MOBILE FIRE SUPPRESSION SYSTEM

CROSS-REFERENCE TO RELATED APPLICATIONS

This application claims priority to the provisional patent application identified by U.S. Ser. No. 63/371,021, filed Aug. 10, 2022, the entire content of which is hereby expressly incorporated herein by reference.

BACKGROUND

Harvested cotton is baled and stored at a warehouse after it completes a ginning process. These bales may be wet when they arrive at the cotton warehouses for storage. Incidentally, wet cotton bales can spontaneously combust after they are brought to the warehouse for storage, which can lead to disastrous fires if not properly contained. Fire is the highest risk of loss in cotton bales and cotton warehouses, and these fires have caused problems in the cotton industry for over 100 years. In recent years those in the cotton industry have lost substantial amounts of money from cotton bales combusting.

Cotton fires burn hot and fast, and can at times take an entire warehouse with them if not contained quickly. Even when the fire department is called immediately, it can take 15 minutes or longer for a truck to get out to the warehouse, and by that time the damage is already severe. Often times, even after the fire truck arrives, the fire department struggles to contain the fire safely. Temperatures can rise to the point of melting the concrete in the warehouse, causing not only a loss of all cotton inside the warehouse but the warehouse building and foundation as well. For the foregoing reasons, there is a need to for a fire suppression system to put out and contain the fire quickly before the fire has a chance to spread. It is to such a fire suppression system that the present disclosure is directed.

SUMMARY

The problem of quickly suppressing fires in large industrial warehouses is solved by a mobile fire suppression system described herein. The mobile fire suppression system may comprise a pump, a substance release tube (SRT), a first tank, a second tank, and a recirculation valve assembly (RVA). The pump comprises a pump housing defining a suction inlet and a discharge outlet. The SRT comprises a substance inlet and a substance release outlet. The first tank receives a foaming agent and has a first cavity, a first inlet, and a first outlet. The second tank receives the foaming agent and a carrier agent. The second tank comprises a second cavity, a second inlet, and a second outlet, the first outlet being in selective fluid communication with the second cavity. The RVA comprises a recirculation inlet fluidly connected to the discharge outlet of the pump, a release outlet fluidly connected to the substance inlet of the substance release tube, and a recirculation outlet in fluid communication with the second cavity. The RVA is operable to selectively direct a flow from the recirculation inlet to one of the release outlet and the recirculation outlet.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1A:
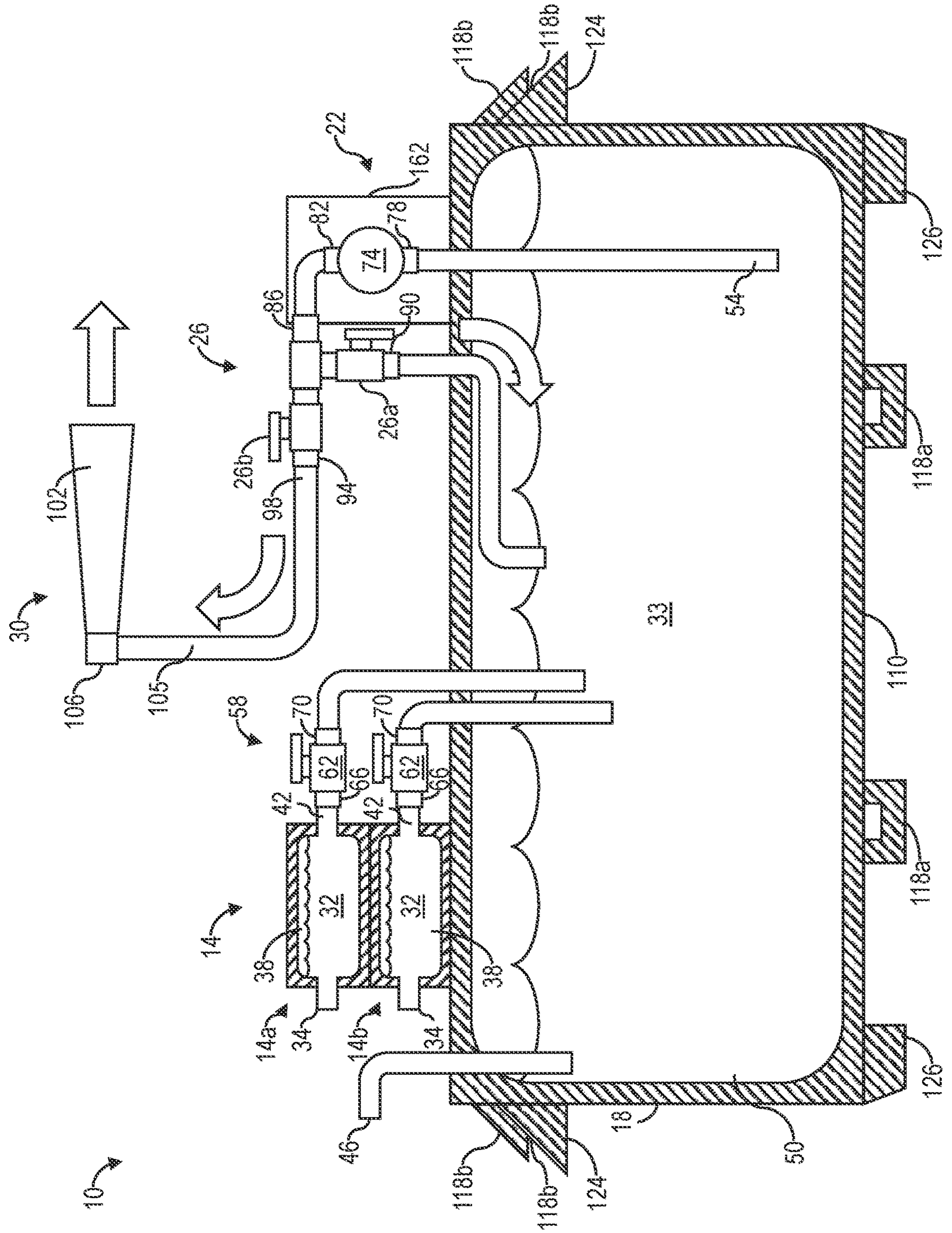
FIG. 1A is a diagrammatic view of an exemplary embodiment of a mobile fire suppression system constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms “comprises,” “comprising,” “includes,” “including,” “has,” “having,” or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, “or” refers to an inclusive and not to an exclusive “or”. For example, a condition A or B is satisfied by one of the following: A is true (or present) and B is false (or not present), A is false (or not present) and B is true (or present), and both A and B are true (or present).

In addition, use of the “a” or “an” are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

When values are expressed as approximations, e.g., by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Referring now to the drawings, and in particular to FIG. 1A, shown therein is a diagrammatic view of an exemplary embodiment of a mobile fire suppression system 10 constructed in accordance with the present disclosure. Generally, the mobile fire suppression system 10 comprises one or more foaming agent tank 14 (hereinafter "foaming agent tanks 14"), a carrier agent tank 18, a pump 22, a recirculation valve assembly 26, and a substance release tube 30. In use, a foaming agent 32 is released from the foaming agent tanks 14 and into the carrier agent tank 18 containing a carrier agent 33 to form a foam solution. With the recirculation valve assembly 26 in a recirculation position, the pump 22 recirculates the foam solution in the carrier agent tank 18 to mix the foaming agent with the carrier agent. With the recirculation valve assembly 26 in a release position, the pump 22 pumps the foam solution out of the carrier agent tank 18, out of the substance release tube 30, and onto a fire (e.g., a burning cotton bale) to suppress the fire.

Each of the foaming agent tanks 14 may comprise a foaming agent inlet 34, a foaming agent cavity 38, and a foaming agent outlet 42. In use, the foaming agent cavities 38 of the foaming agent tanks 14 may receive the foaming agent 32 (i.e., a concentrated formulation capable of producing foam when combined with the carrier agent 33) formulated to suppress fires (e.g., a Class A foam conforming to the U.S. Department of Agriculture Forest Service Specification 5100-307a, as amended May 17, 2010). A user may fill the foaming agent cavities 38 with the foaming agent 32 via the foaming agent inlets 34. In certain embodiments, the foaming agent tanks 14 comprise a first foaming agent tank **14*a* and a second foaming agent tank 14*b*. In certain embodiments, each of the foaming agent cavities 38 is sized to receive up to five gallons of the foaming agent 32. However, persons having ordinary skill in the art will understand that the foaming agent cavities 38** may be of any size.

The carrier agent tank 18 generally comprises a carrier agent inlet 46, a carrier agent cavity 50, and a carrier agent outlet 54. The foaming agent outlets 42 of the foaming agent tanks 14 may be in selective fluid communication with the carrier agent cavity 50. That is, one or more valve 58 (hereinafter "valves 58") may be positioned between the foaming agent outlets 42 and the carrier agent cavity 50. Each of the valves 58 may comprise a housing 62 defining a valve inlet 66 fluidly connected to the foaming agent cavity 38 and a valve outlet 70 fluidly connected to the carrier agent cavity 50. Each of the valves 58 may have an open position—in which the foaming agent outlets 42 are in fluid communication with the carrier agent cavity 50—and a closed position—in which the fluid communication between the foaming agent outlets 42 and the carrier agent cavity 50 is obstructed.

In use, the carrier agent tank 18 may receive the foaming agent 32 and the carrier agent 33 (e.g., water) such that the foaming agent 32 combines with the carrier agent 33 to form a foam solution. A user may fill the carrier agent cavity 50 with the carrier agent 33 via the carrier agent inlet 46. In certain embodiments, the carrier agent cavity 50 is sized to receive up to 400 gallons of the carrier agent 33. However, persons having ordinary skill in the art will understand that the carrier agent cavity 50 may be of any size.

The pump 22 may comprise a pump housing 74 defining a suction inlet 78 fluidly connected to the carrier agent cavity 50 via the carrier agent outlet 54, for example, and a discharge outlet 82 fluidly connected to a recirculation inlet 86 of the recirculation valve assembly 26. The recirculation valve assembly 26 is positioned between the discharge outlet 82 and the substance release tube 30. The pump 22 may be operable to suction the foam solution from the carrier agent cavity 50 and discharge the foam solution into the recirculation valve assembly 26. The recirculation valve assembly 26 may further comprise a recirculation outlet 90 fluidly connected to the carrier agent cavity 50 and a release outlet 94. The recirculation valve assembly 26 may be operable to selectively direct a flow of the foam solution from the recirculation inlet 86 to one of the recirculation outlet 90 and the release outlet 94. That is, the recirculation valve assembly 26 may have a recirculation position—in which the flow is directed from the recirculation inlet 86 to the recirculation outlet 90 so as to recirculate the foam solution into the carrier agent cavity 50 to mix the foaming agent 32 with the carrier agent 33—and a release position—in which the flow is directed from the recirculation inlet 86 to the release outlet 94 for discharging the foam solution through the substance release tube 30.

In certain embodiments, the recirculation valve assembly 26 comprises a recirculation valve 26*a* and a release valve 26*b*, each having an open position and a closed position. That is, placing the recirculation valve assembly 26 into the recirculation position may comprise placing the recirculation valve 26*a* in the open position and the release valve 26*b* in the closed position, and placing the recirculation valve assembly 26 into the release position may comprise placing the recirculation valve 26*a* in the closed position and the release valve 26*b* in the open position.

The substance release tube 30 may comprise a substance inlet 98 fluidly connected to the release outlet 94 of the recirculation valve assembly 26 and a substance release outlet 102. In certain embodiments, the substance release tube 30 further comprises a feed portion 105 movably connected to a turret 106 capable of moving (e.g., rotating, raising, and/or lowering) to direct the substance release outlet 102 in different directions to release the foam solution onto a location determined by the user.

Figure 1B:
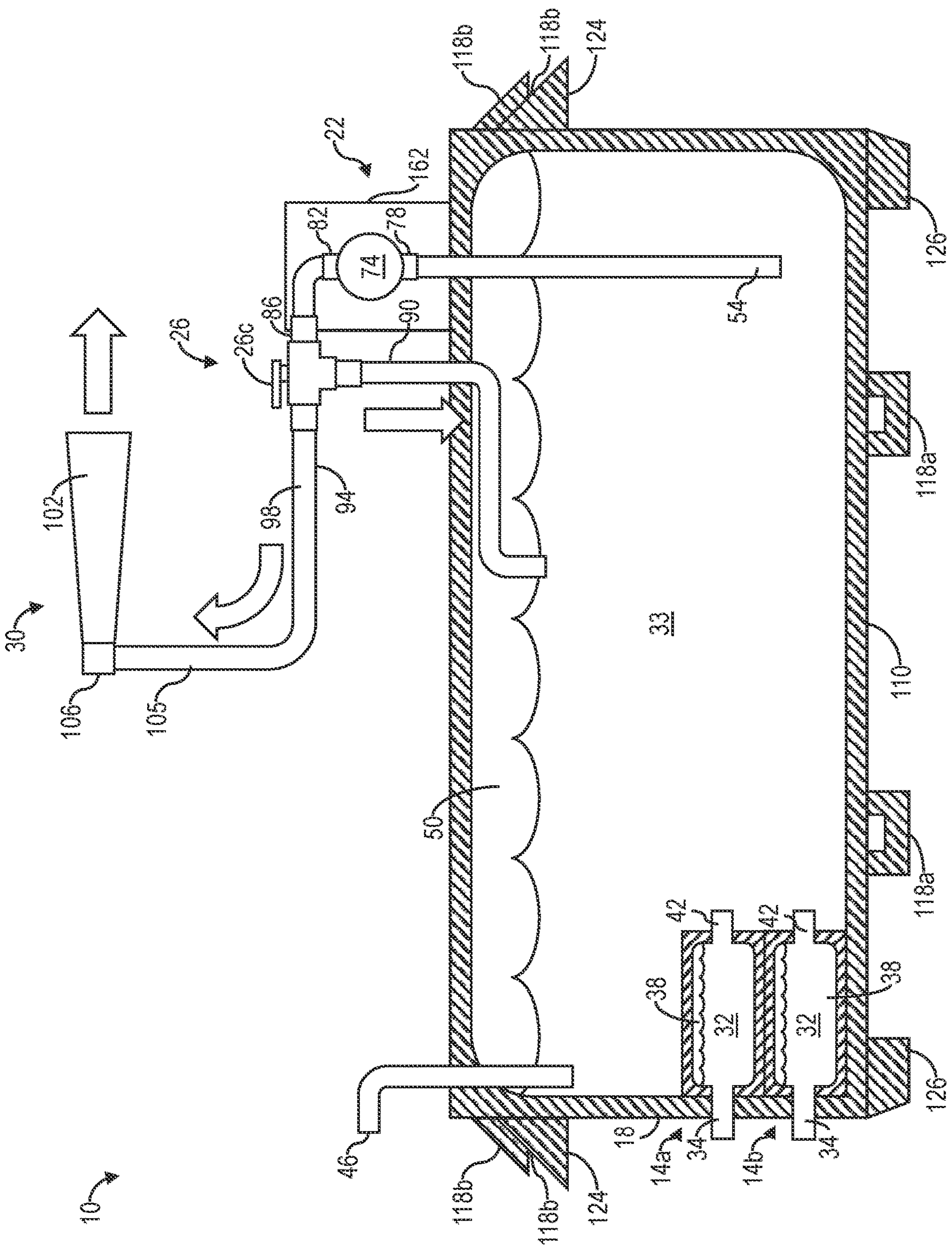
FIG. 1B is a diagrammatic view of another exemplary embodiment of the mobile fire suppression system shown in FIG. 1.

Referring now to FIG. 1B, in certain embodiments, the recirculation valve assembly 26 comprises a three-way valve 26*c* having a first position and a second position. That is, placing the recirculation valve assembly 26 into the recirculation position may include placing the three-way valve 26*c* in the first position, and placing the recirculation valve assembly 26 into the release position may include placing the three-way valve 26*c* in the second position.

In certain embodiments, the foaming agent tanks 14 are contained within the carrier agent cavity 50. In such embodiments, the foaming agent outlets 42 of the foaming agent tanks 14 may be in direct fluid communication with the carrier agent cavity 50.

Figure 2:
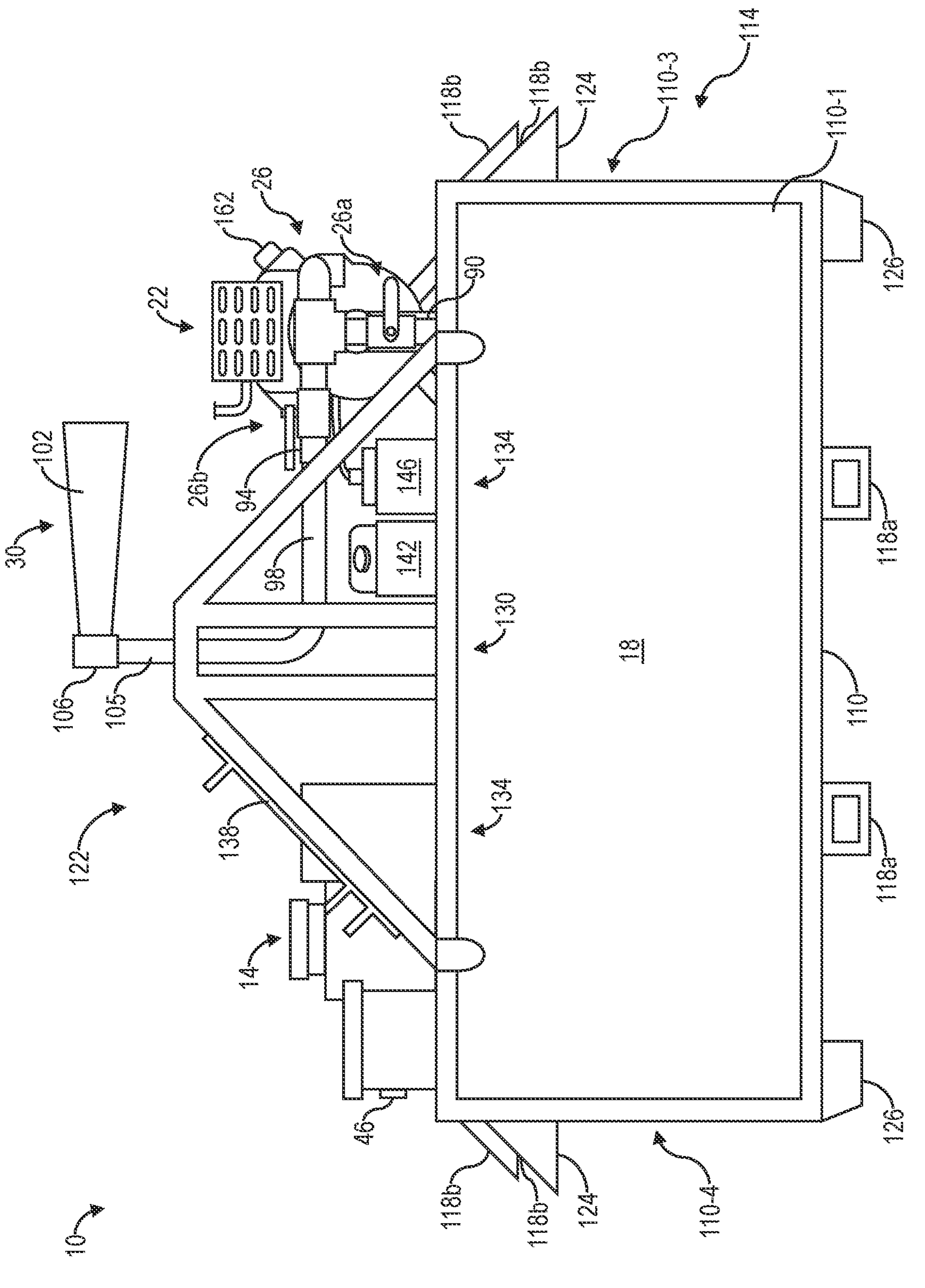
FIG. 2 is a front view of the mobile fire suppression system shown in FIG. 1.

Referring now to FIG. 2, the mobile fire suppression system 10 may further comprise a support frame 110 supporting at least one of the foaming agent tanks 14, the carrier agent tank 18, the pump 22, the recirculation valve assembly 26, and the substance release tube 30. The support frame 110 generally comprises a base portion 114 which may be a four-sided prism, for example having a length, a width and a height corresponding to a size of a cotton bale (e.g., four-sided prism) so that the base portion 114 can be engaged and lifted by the industrial machine having a bale clamp. In one embodiment, the length can be 89 inches, the width can be 41.25 inches and the height can be 34.75 inches. The mobile fire suppression system 10 also includes two or more engagement points 118 attached to the base portion 114 of the support frame 110. The support frame 110 also includes a boom portion 122 attached to the base portion 114. The support frame 110 can be formed of a plurality of rigid members, such as steel, that are welded together. The engagement points 118 may also be constructed of a rigid material (e.g., steel) and may be welded or otherwise connected to the support frame 110. The engagement points 118 may extend outward from the support frame 110 and have downward facing lifting surfaces 124 configured to be engaged by an industrial vehicle (e.g., a tractor or a fork lift) for lifting and supporting the weight of the fire suppression system 10 so that the fire suppression system 10 can be moved from a storage location to an operable location for putting out or containing a fire. In some embodiments, the support frame 110 may comprise, for example, a first side 110-1, a second side 110-2 (shown in FIG. 3), a first end 110-3 (shown in FIG. 4), and a second end 110-4 (shown in FIG. 5).

The base portion 114 may be configured to support the carrier agent tank 18. The base portion 114 may surround at least a portion of the carrier agent tank 18. The base portion 114 may comprise one or more foot 126 (hereinafter "feet 126") positioned below the carrier agent tank 18 for supporting the base portion 114 on a surface such as the ground or a concrete foundation.

The engagement points 118 may be configured to engage an arm of an industrial vehicle (e.g., a forklift). The engagement points 118 may comprise two or more fork engagement points 118*a*—for engaging a fork of a forklift—and/or two or more clamp engagement points 118*b*—for engaging a bale clamp attachment of a forklift. As shown in FIG. 2, in certain embodiments, the engagement points 118 comprise four clamp engagement points 118*b*, two of the clamp engagement points 118*b* attached to the base portion 114 at a first height and another two of the clamp engagement points 118*b* attached to the base portion 114 at a second height different from the first height.

The boom portion 122 may be configured to provide lateral support the substance release tube 30. The boom portion 112 extends upwardly from the base portion 114, and may surround at least a portion of the substance release tube 30. The boom portion 122 may comprise an upright portion 130 and one or more wing portion 134 (hereinafter "wing portions 134"), the upright portion 130 extending vertically from the base portion 114 and the wing portions 134 connected to and supporting the upright portion 130 at an angle (e.g., 45 degrees). The boom portion 122 may further comprise one or more loop 138 configured to hold a wrench to open fire plugs/hydrants.

In certain embodiments, the support frame 110 further comprises a fuel receptacle 142 for receiving a fuel container and/or a battery receptacle 146 for receiving a battery. In some embodiments, the fuel receptacle 142 and/or the battery receptacle 146 can be positioned on a top surface, i.e., above, the carrier agent tank 18.

Figure 3:
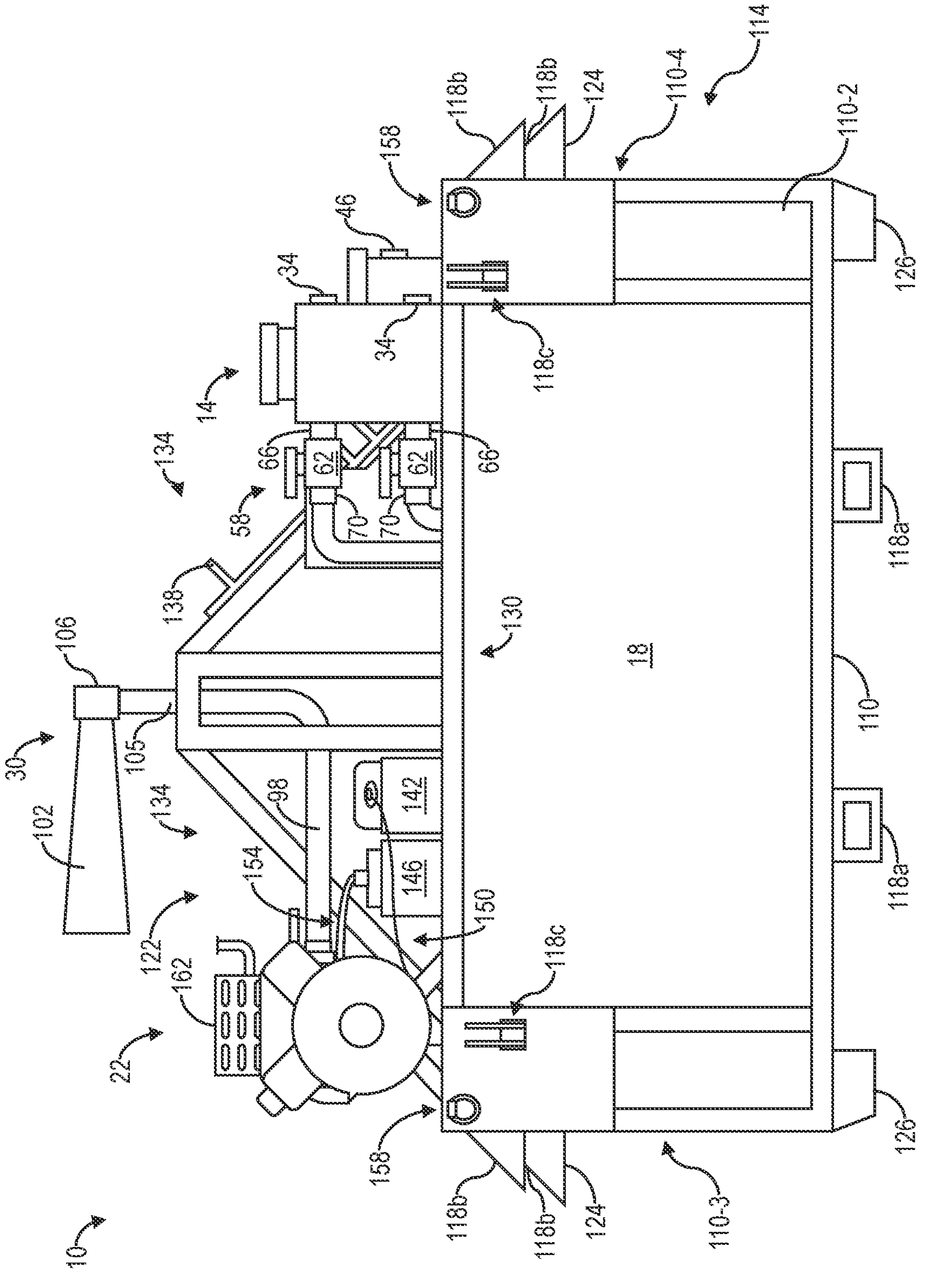
FIG. 3 is a back view of the mobile fire suppression system shown in FIG. 1.

Referring now to FIG. 3, in certain embodiments, the engagement points 118 further comprise two or more auxiliary engagement points 118*c* (hereinafter "auxiliary engagement points 118*c*") positioned on a back surface of the support frame 110. One of the auxiliary engagement points 118*c* may be attached to the base portion 114 at a first height and another of the auxiliary engagement points 118*c* attached to the base portion 114 at a second height different from the first height. The position of the auxiliary engagement points 118*c* are configured to mate with and accommodate a cotton bale clamp attachment used by forklifts in cotton warehouses. The auxiliary engagement points 118*c* are lift points that hook over the top of the cotton bale clamp attachment to prevent the fire suppression system 10 from tipper forward or sliding forward while moving. In certain embodiments, the fire suppression system 10 includes two or more strap loops 158 (hereinafter "strap loops 158") connected to the support frame 110 and operable to engage a strap in order to secure the mobile fire suppression system 10 onto a trailer or a vehicle (e.g., for transporting the mobile fire suppression system 10 to/from a site).

In embodiments of the mobile fire suppression system 10 comprising the fuel receptacle 142 and the battery receptacle 146, the mobile fire suppression system 10 may further comprise a fuel line 150 and/or a battery lead 154. The pump 22 may include a source of motive force 162 such as an engine or an electric motor operably connected to a pump impeller (not shown). In the embodiment shown, the pump 22 includes the engine that may be powered by a suitable fuel such as gasoline or diesel. The fuel line 150 may be configured to provide the engine with fuel from a fuel container contained in the fuel receptacle 142. When the source of motive force is an electric motor, the battery lead 154 may be configured to provide the electric motor with electric power from a battery contained in the battery receptacle 146.

Figure 5:
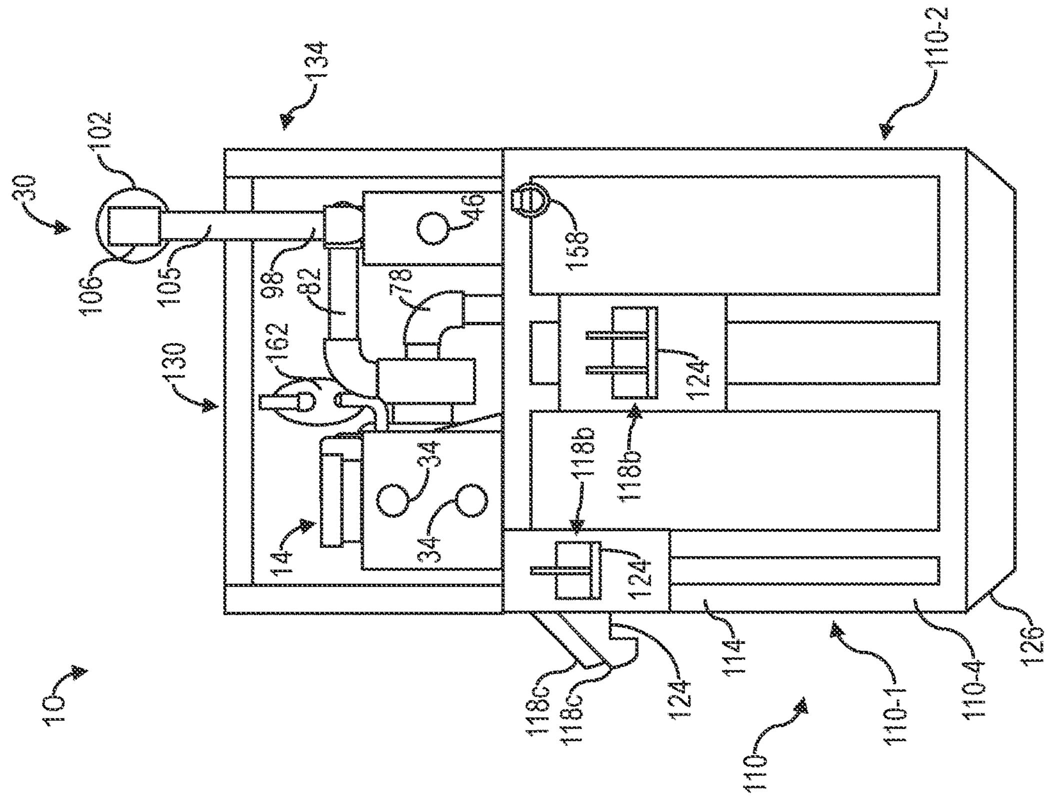
FIG. 5 is a left-side view of the mobile fire suppression system shown in FIG. 1.
Figure 4:
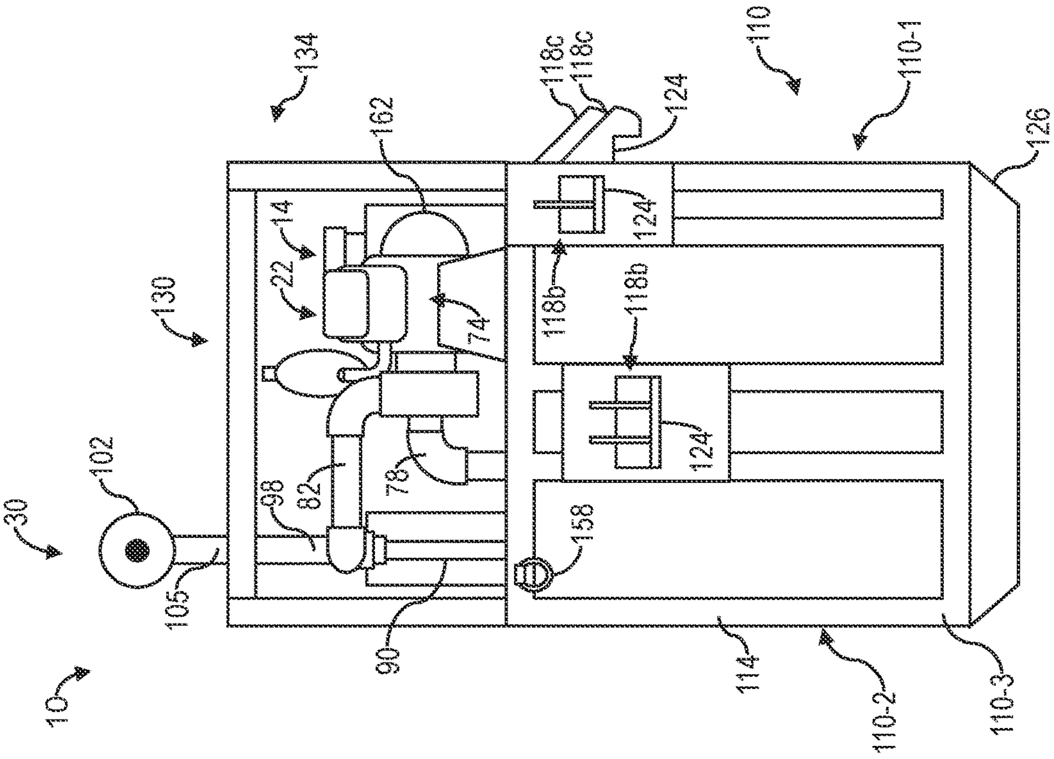
FIG. 4 is a right-side view of the mobile fire suppression system shown in FIG. 1.

Referring now to FIGS. 4-5, in certain embodiments, some of the clamp engagement points **118*b* (i.e., the clamp engagement points 118*b* attached to the base portion 114 at the first height) have a first width and others of the clamp engagement points 118*b* (i.e., the clamp engagement points 118*b* attached to the base portion 114 at the second height) have a second width that is different from the first width. The clamp engagement points 118*b* are rigidly connected to the support frame 110 so that the clamp engagement points 118*b* can be engaged by a clamp attachment for a forklift, for example, and used to lift and reposition the fire suppression system 10**.

Figure 6:
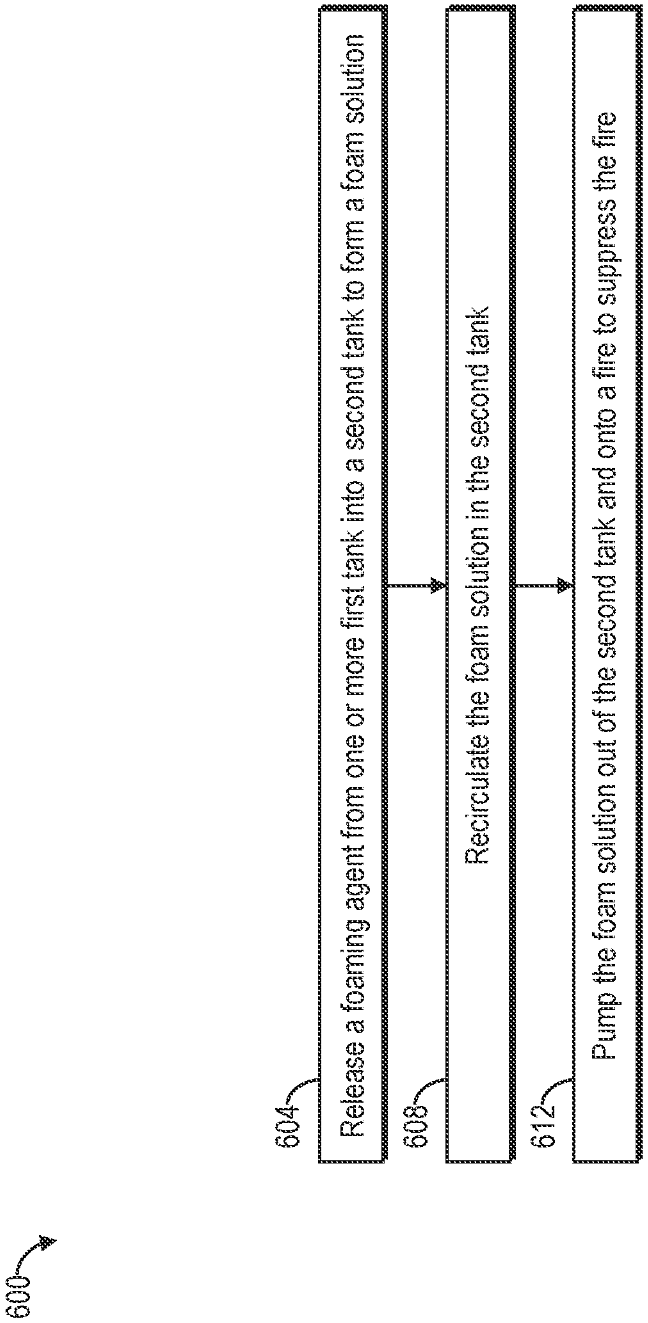
FIG. 6 is a process flow diagram of an exemplary embodiment of a method for suppressing a fire performed in accordance with the present disclosure.

Referring now to FIG. 6, shown therein is a process flow diagram of a method 600 for suppressing a fire performed in accordance with the present disclosure. Generally, the method 600 comprises the steps of: releasing the foaming agent 32 from one or more foaming agent tank 14 into a carrier agent tank 18 containing the carrier agent 33 to form a foam solution (step 604); recirculating the foam solution in the carrier agent tank 18 (step 608); and pumping the foam solution out of the carrier agent tank 18 and onto a fire to suppress the fire (step 612). In certain embodiments, the step of releasing the foaming agent from the one or more foaming agent tank 14 and into the carrier agent tank 18 (step 604) comprises placing one or more valve 58 positioned between the one or more foaming agent tank 14 and the carrier agent tank 18 into an open position. In certain embodiments, the step of recirculating the foam solution in the carrier agent tank 18 (step 608) comprises placing a recirculating valve assembly 26 into a recirculation position. In certain embodiments, the step of pumping the foam solution out of the carrier agent tank 18 and onto a fire comprises placing the recirculating valve assembly 26 into a release position.

In certain embodiments, the step of placing the recirculating valve assembly 26 into the recirculation position comprises placing a three-way valve **26*c* of the recirculating valve assembly 26 into a first position. However, in other embodiments, the step of placing the recirculation valve assembly 26 into the recirculation position comprises placing a recirculation valve 26*a* of the recirculation valve assembly 26 into an open position and placing a release valve 26*b* of the recirculation valve assembly 26** into a closed position.

In certain embodiments, the step of placing the recirculation valve assembly 26 into the release position comprises placing a three-way valve **26*c* of the recirculation valve assembly 26 into a second position. However, in other embodiments, the step of placing the recirculation valve assembly 26 into the release position comprises placing a recirculation valve 26*a* of the recirculation valve assembly 26 into a closed position and placing a release valve 26*b* of the recirculation valve assembly 26** into an open position.

Shown in FIGS. 7A-7D is another embodiment of a support frame **110*a* that is identical in construction and function as the support frame 110, except as described below. The support frame 110*a* includes a base portion 114*a* and a boom portion 122*a*. The boom portion 122*a* may comprise the upright portion 130 as described above; however, the wing portions 134 may be replaced with a horizontal portion 134*a***.

Figure 7A:
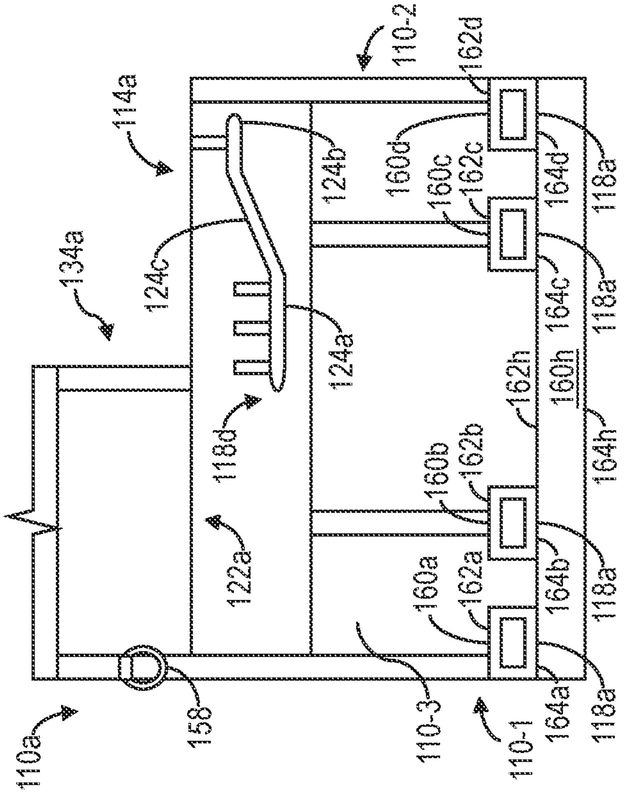
FIG. 7A is a right-side view of an alternative support frame constructed in accordance with the present disclosure.
Figure 7C:
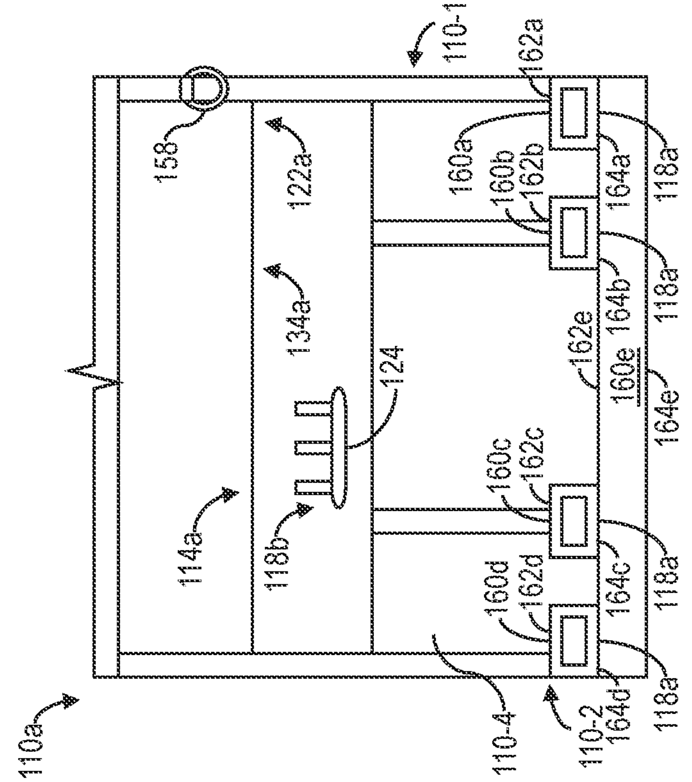
FIG. 7C is a left-side view of the alternative support frame shown in FIG. 7A.
Figure 7B:
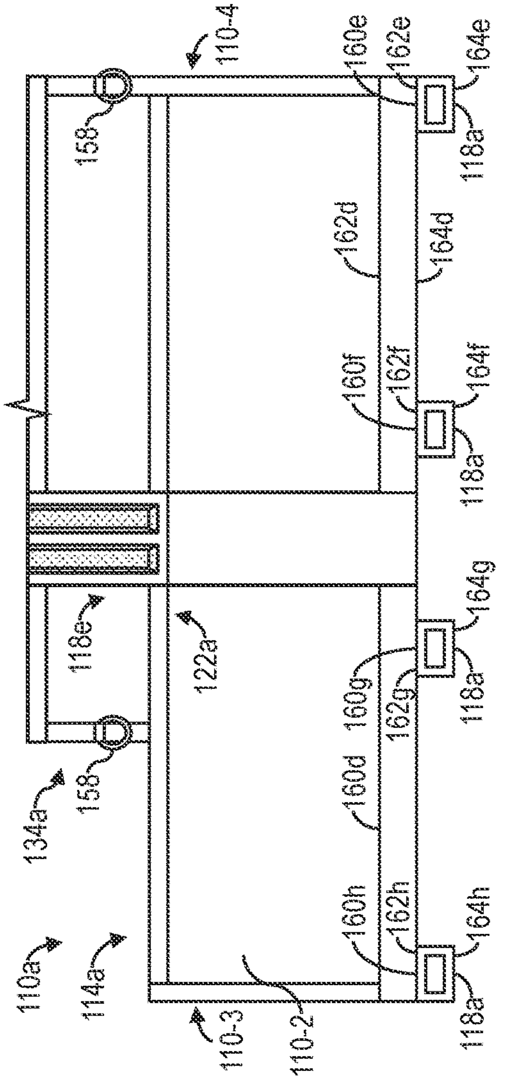
FIG. 7B is a back view of the alternative support frame shown in FIG. 7A.
Figure 7D:
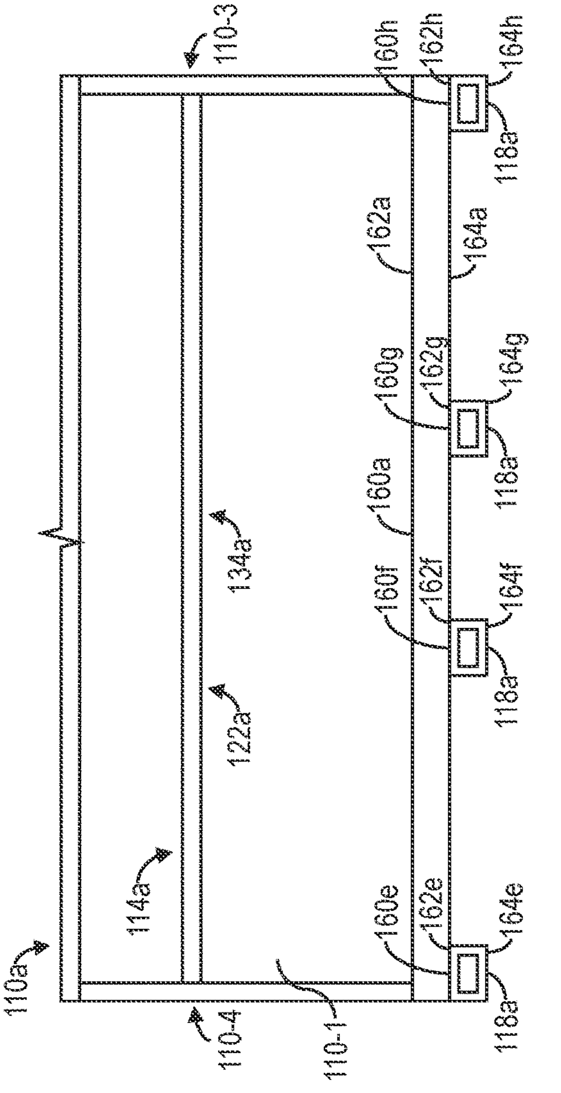
FIG. 7D is a front view of alternative support frame shown in FIG. 7A.

Similar to the support frame 110, the support frame **110*a*, may include a first side 110-1, a second side 110-2, a first end 110-3, and a second end 110-4. To provide greater ability to lift the support frame 110*a* with a forklift from the first end 110-3 and the second end 110-4, the support frame 110*a* includes a plurality of fork engagement points 118*a* on each of the first side 110-1 (as shown in FIG. 7D), the second side 110-2 (as shown in FIG. 7B), the first end 110-3 (as shown in FIG. 7A), and the second end 110-4 (as shown in FIG. 7C). As will be explained below, the fork engagement points 118*a* may be formed by a plurality of spatially disposed tubes 160, which are numbered in FIGS. 7A-7D as 160*a-h* for purposes of clarity. In the example shown, each of the tubes 160*a-h* has a rectangular cross-section. The tubes 160*a-d* extend from the first end 110-3 to the second end 110-4. The tubes 160*e-h* extend from the first side 110-1 to the second side 110-2. Because the support frame 110*a* includes a rectangular shape footprint, the tubes 160*a-d* are oriented at a 90-degree angle relative to the tubes 160*e-h*, although it should be understood that the angle between the tubes 160*a-d* and the tubes 160*e-h* can vary. The tubes 160*a-d* may be considered a first set of tubes 160 and the tubes 160*e-h* may be considered a second set of tubes 160. In the embodiment that is shown, the first set of tubes 160, i.e., the tubes 160*a-d* are above the tubes 160*e-h*. The tubes 160*a-h* include top surfaces 162*a-h* and bottom surfaces 164*a-h*. The bottom surfaces 164*a-d* of the tubes 160*a-d* engage the top surfaces 162*e-h* of the tubes 160*e-h*. In some embodiments the bottom surfaces 164*a-d* of the tubes 160*a-d* are connected to the top surfaces 162*e-h*. The connection may be made by any suitable manner, such as bonding or welding. Although the support frame 110*a* has been described with eight tubes 160*a-h*, it should be understood that more tubes 160*a-h* can be used. Further, by having four fork engagement points 118*a* on each of the first side 110-1, the second side 110-2, the first end 110-3 and the second end 110-4 provides greater flexibility and improved speed in lifting the support frame 110*a* with the forklift. For example, the forks of the forklift may engage any two of the fork engagement points 118*a* on each of the first side 110-1, the second side 110-2, the first end 110-3 and the second end 110-4 so long as the support frame 110*a* is balanced on the forks of the forklift. Increasing the number of fork engagement points 118*a* on each of the first side 110-1, the second side 110-2, the first end 110-3 and the second end 110-4 enhances the chance that a distance between the forks need not be adjusted before the forks are used to engage two of the fork engagement points 118*a* thereby enhancing the speed at which the forklift can be used to lift the support frame 110*a***.

As shown in FIG. 7A, on the first end 110-3 of the support frame **110*a*, the engagement points 118 may further comprise one or more bilevel engagement point 118*d* having a first downward facing lifting surface 124*a* located at a first elevation, a second downward facing lifting surface 124*b* located at a second elevation different from the first elevation, and an inclined lifting surface 124*c* located between the first downward facing lifting surface 124*a* and the second downward facing lifting surface 124*b*. The inclined lifting surface 124***a* may span a distance between the first elevation and the second elevation. Further, on the first end 110-3 of the support frame 110*a* (shown in FIG. 7A), the boom portion 122*a* may not span the distance between the first side 110-1 and the second side 110-2. Instead, the boom portion 122*a* may terminate at a point between the first side 110-1 and the second side 110-2.

As shown in FIG. 7B, on the second side 110-2 of the support frame 110*a*, the engagement points 118 may further comprise one or more stability engagement point 118*e* (hereinafter the "stability engagement points 118*e*") configured to engage an attachment frame of a forklift having one of a fork attachment and a bale clamp attachment attached thereto. In some implementations, the stability engagement points 118*e* engaging the attachment frame of the forklift may prevent the support frame 110*a* from shifting while being lifted or transported by the fork attachment of the forklift. Further, in some implementations, the stability engagement points 118*e* engaging the attachment frame of the forklift may provide vertical stability to the support frame 110*a* while being lifted or transported by the bale clamp attachment of the forklift. Further, on the second side 110-2 of the support frame 110*a*, the boom portion 122*a* may not span the distance between the first end 110-3 and the second end 110-4. Instead, the boom portion 122*a* may terminate at a point between the first end 110-3 and the second end 110-4.

As shown in FIG. 7C, on the second end 110-4 of the support frame 110*a*, the engagement points 118 may comprise a clamp engagement point 118*b*, as described above.

In conclusion, the fire suppression system 10 and the exemplary method 600 of using the fire suppression system 10 have been described. The fire suppression system 10 can be placed at a site where a risk of fire exists, such as a warehouse for storing products having at least one industrial machine onsite. Exemplary products include, but are not limited to agricultural products, such as cotton bales, hay bales, wood, and the like; industrial products such as chemicals; and/or consumer products such as textiles. When a fire is started through spontaneous combustion, equipment failure, or a natural weather event, for example, the industrial machine can be engaged to lift and transport the fire suppression system 10 to the location of the fire so that the fire suppression system 10 can be used to quickly contain the fire at its beginning phase to put the fire out. Simultaneously, other industrial machines can be used to move other products away from the site of the fire while the fire is being contained to reduce the risk of the fire spreading.

With respect to cotton, fire is the number one risk of disastrous loss in cotton bales and cotton warehouse buildings. The engagement points 118*b* on the sides of the support frame 110 may be configured to be used with conventional cotton bale clamps connected to a forklift. This permits the forklifts within warehouses storing cotton bales to quickly lift and transport the fire suppression system 10 to apply the foam solution to put out and/or contain a fire. It is respectfully submitted that the disclosed fire suppression system 10 solves a long-felt but unsolved need in the cotton industry to assist in quickly containing and putting out a fire without incurring a disastrous loss in cotton bales and cotton warehouse buildings.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A mobile fire suppression system, comprising:

a pump comprising a pump housing defining a suction inlet and a discharge outlet;

a substance release tube comprising a substance inlet and a substance release outlet;

a first tank for receiving a foaming agent, the first tank comprising a first cavity, a first inlet, and a first outlet;

a second tank for receiving the foaming agent and a carrier agent, the second tank comprising a second cavity, a second inlet, and a second outlet, the second cavity being in selective fluid communication with the first outlet of the first tank and the suction inlet of the pump;

a recirculation valve assembly comprising a recirculation inlet fluidly connected to the discharge outlet of the pump, a release outlet fluidly connected to the substance inlet of the substance release tube, and a recirculation outlet in fluid communication with the second cavity of the second tank, the recirculation valve assembly being operable to selectively direct a flow from the recirculation inlet to one of the release outlet and the recirculation outlet;

a support frame supporting at least one of the pump, the substance release tube, the first tank, the second tank, and the recirculation valve assembly, the support frame having at least two of a first side, a second side, a first end, and a second end; and one or more clamp engagement points attached to the at least two of the first side, the second side, the first end, and the second end, each of the one or more clamp engagement points operable to engage an arm of a bale clamp attachment of a forklift.

2. The mobile fire suppression system of claim 1, wherein the recirculation valve assembly comprises a recirculation valve and a release valve, the recirculation valve comprising the recirculation outlet, and the release valve comprising the release outlet.

3. The mobile fire suppression system of claim 1, further comprising one or more valves positioned between the first outlet and the second cavity, each of the one or more valves having an open position and a closed position.

4. The mobile fire suppression system of claim 3, wherein each of the one or more valves comprises a housing defining a valve inlet fluidly connected to the first cavity and a valve outlet fluidly connected to the second cavity.

5. The mobile fire suppression system of claim 1, wherein the recirculation valve assembly comprises a three-way valve having a first position and a second position, wherein the three-way valve in the first position directs the flow from the recirculation inlet to the recirculation outlet, and the three-way valve in the second position directs the flow from the recirculation inlet to the release outlet.

6. The mobile fire suppression system of claim 5, wherein the recirculation valve assembly comprises a recirculation valve and a release valve, each of the recirculation valve and the release valve having an open position and a closed position, wherein the recirculation valve in the open position and the release valve in the closed position directs the flow from the recirculation inlet to the recirculation outlet, and the recirculation valve in the closed position and the release valve in the open position directs the flow from the recirculation inlet to the release outlet.

7. The mobile fire suppression system of claim 1, wherein the mobile fire suppression system further comprises one or more fork engagement points attached to the at least two of the first side, the second side, the first end, and the second end, each of the one or more fork engagement points operable to engage a fork of a forklift.

8. The mobile fire suppression system of claim 1, wherein the substance release tube includes a turret operable to direct the substance release outlet at a determined location.

* * * * *